United States Patent

Geimer et al.

[11] Patent Number: 5,899,107
[45] Date of Patent: May 4, 1999

[54] PROCESS AND PRESSING TOOLS FOR JOINING TUBULAR ELEMENTS

[75] Inventors: Joachim Geimer, Gelnhausen-Höchst; Wilfried Zülch, Gelnhausen, both of Germany

[73] Assignee: Veritas Gummiwerke AG, Germany

[21] Appl. No.: 08/945,505

[22] PCT Filed: Jul. 24, 1995

[86] PCT No.: PCT/EP95/02918

§ 371 Date: Jan. 22, 1998

§ 102(e) Date: Jan. 22, 1998

[87] PCT Pub. No.: WO96/35526

PCT Pub. Date: Nov. 14, 1996

[30] Foreign Application Priority Data

May 8, 1995 [DE] Germany ............... 195 16 830

[51] Int. Cl.⁶ .................................................. B21D 39/04
[52] U.S. Cl. ........................... 72/402; 72/57; 29/237
[58] Field of Search .................... 72/402, 465, 57; 29/237

[56] References Cited

U.S. PATENT DOCUMENTS

| | | | |
|---|---|---|---|
| 638,554 | 12/1899 | Burton | 72/57 |
| 3,564,884 | 2/1971 | Hinshaw | 72/57 |
| 3,576,122 | 4/1971 | Churia | 72/57 |
| 4,330,918 | 5/1982 | Whitted | 29/237 |
| 4,641,407 | 2/1987 | Blevins | 72/402 |
| 4,779,333 | 10/1988 | Rabe | 29/237 |
| 4,989,443 | 2/1991 | Swandon | 72/452 |
| 5,201,207 | 4/1993 | Organi | 72/57 |

FOREIGN PATENT DOCUMENTS

| | | | |
|---|---|---|---|
| 680080 | 10/1952 | United Kingdom | 72/57 |
| 2 084 063 | 4/1982 | United Kingdom . | |
| 2277893 | 11/1994 | United Kingdom | 72/57 |

*Primary Examiner*—Daniel C. Crane
*Attorney, Agent, or Firm*—Finnegan, Henderson Farabow, Garrett & Dunner, LLP

[57] ABSTRACT

The present invention relates to a press tool for connecting a tubular element to an element which is arranged in the interior and substantially adapted to the inner diameter, the press tool comprising at least one press jaw and a pressure distributing element which is annularly arranged between the press jaw and the outer circumference of the tubular element and which exhibits the characteristics of an incompressible liquid and which is arranged around the connecting portion of the elements to be connected and distributes the pressing power generated by the press jaws substantially over the outer circumference of the tubular element. Furthermore, the present invention relates to a method for connecting a tubular element to an element which is arranged in the interior and substantially adapted to the inner diameter, wherein pressure which is evenly distributed over the circumference of the tubular element is exerted at the same time to the exclusion of leaky spots.

8 Claims, 2 Drawing Sheets

PROCESS AND PRESSING TOOLS FOR JOINING TUBULAR ELEMENTS

This application is a 371 of PCT/EP95/02918, filed Jul. 24, 1995.

The present invention relates to a press tool and a method for connecting a tubular element to an element which is arranged in the interior and substantially adapted to the inner diameter.

Flexible tubes are normally connected by means of a press sleeve to pipes or to specifically shaped connecting pieces with the aid of a multijaw-type press device. So-called press gaps are created between the individual press jaws by this connecting technique.

It has also been known that, for instance for the purpose of achieving a tight connection of flexible tubes or tube bends with fittings or with metal or plastic tubes or pipes, a tubular body is inserted into a tube end and a sheet metal sleeve is slid externally over the tube end and that this member is necked in a press with the aid of a plurality of movable press jaws against the tubular body to compress the tube wall. To ensure sufficient tightness between the outer circumference of the tubular body and the tube wall, there are even two adjacent neckings of circumferentially distributed rows of recesses. Such a connection, however, leads to leakage, especially when there are great temperature variations and strong impacts on the tube connection.

Furthermore, DE-AS 1 675 221 discloses an undetachable pipe connection for metal pipes. The connection is here achieved with the aid of a metallic tubular sleeve which remains at the connecting location after the metal pipes have been connected. The sleeve itself consists of an outer pressure ring and an inner sleeve, with a ring chamber being created between these two members. To interconnect two metal pipes, the sleeve is slid over both pipe ends, and pressure is subsequently supplied through an inlet port into the annular chamber, resulting in a deformation on all sides of the inner sleeve arranged around the metal ends. To achieve a tight connection between the metal tubes, a sealing ring of a synthetic or natural, electrically insulating sealing material is provided and received in an annular groove between the metal pipes to be connected and by the inner sleeve. Both the sealing material or sealing ring and the metal sleeve will remain at the connecting location after the metal pipes have been connected.

Furthermore, it is for instance known from EP-A 134 566 that two pipes are connected by radially deforming the tubular elements to be connected. In the described method, a plurality of radially extending grooves are arranged at the connecting location with the aid of a device in which a plurality of rolls are arranged around the pipes to be connected. Because of its special construction, this device occupies a relatively large space around the members to be connected for ensuring a complete connection.

Furthermore, EP-A 218 049 discloses a seal for tubular elements, wherein a bushing is inserted into a metal pipe for sealing purposes. The seal is here established via a deformable material which is arranged on the outside of the bushing in contact with the inner surface of the tubular element. Whenever a force, such as a pressure, is exerted on the deformable material, the latter will deform radially and will firmly and/or sealingly be pressed against the inner surfaces of the tubular element.

Hence, it has so far not been possible to achieve a tight connection between two metallic pipes or a pipe and any other desired element, such as a flexible tube, without the use of a so-called sleeve or without so-called press gaps being formed between the individual press jaws at the connecting location in the course of the connecting process.

Both the press sleeve and the resultant press gaps are of disadvantage to many applications, since the connection becomes shapeless on the one hand and the pipe is adversely affected by the press gap and the shear effects on the other hand.

Furthermore, the space required for ensuring a completely tight connection around the pipe circumference is often limited, especially at locations that are hardly accessible, so that limits are set to known tools and the connections have partly to be established already before assembly.

It is therefore the object of the present invention to provide a press tool as well as a method which are employed for connecting pipes or tubes with other elements and overcome the drawbacks of the prior art.

In accordance with the present invention, this object is achieved with respect to a press tool for connecting a tubular element to an element which is arranged in the interior and substantially adapted to the inner diameter, in that the press tool comprises at least one press jaw and a pressure distributing element which is annularly arranged between the press jaw and the outer circumference of the tubular element and which exhibits the characteristics of an incompressible liquid and which is arranged around the connecting portion of the elements to be connected and distributes the pressing power generated by the press jaws substantially over the outer circumference of the tubular element.

The novel press tool makes it possible to connect or press tubular elements and tubular sections to elements shaped differently, without the press tool requiring any adaptation to specifically given shapes, whereby a flexible use of the press tool is made possible. Since the press tool need no longer be adapted to the existing shapes in a troublesome manner, both the production of the press tool and that of the end product can be carried out at considerably reduced costs.

Furthermore, the use of the press tool of the invention, especially of the pressure distributing element, permits a connection of the elements to be connected, without so-called press gaps being created between the individual press jaws. The formation of press gaps is prevented in that the forces introduced by the press jaws onto the pressure distributing element, which exhibits the characteristics of an incompressible liquid, take a quasi constant radial course over the pressure distributing element.

In particular, the uniform force distribution achieved through the pressure distributing element makes it possible to establish connections at locations or on portions which are hardly accessible and on which it might happen that only one single press jaw can be used.

With the press tool of the invention, it is possible to achieve extremely tight connections, so that the press tool is suited for a wide range of applications.

In a preferred embodiment of the present invention, the pressure distributing element consists of rubber or of a ring filled with liquid.

These two embodiments have been found to be especially suited for exerting a constant radial force distribution over the connecting portion.

Furthermore, the pressure distributing element may be provided with a specific profile on a surface of the pressure distributing element that is in contact with the connecting location of the elements to be connected.

Such a preprofiling may be advantageous in the case of specific requirements made on the desired force introduction and distribution.

Furthermore, it has been found to be advantageous when the press tool comprises boundary elements which are arranged laterally next to the pressure distributing elements.

Such boundary elements are preferably used for fully exploiting the force exerted and designed in response to the respective application. The use of boundary elements is especially preferred when pressure distribution elements of rubber of liquid-filled rings are used so as to prevent lateral bulging of the pressure distributing element.

In an embodiment of the press tool, the pressure distributing element consists of individual segments that are directly connected to the press jaws.

Such an embodiment has been found to be advantageous when great distances have to be covered for moving the press tools.

Thanks to the use of different rubber mixtures, this embodiment makes it possible to vary the forces over the connecting portion.

As for the method for connecting a tubular element to an element which is arranged in the interior and adapted to the inner diameter, the above-mentioned object is achieved in that pressure which is evenly distributed over the circumference of the tubular element is exerted at the same time to the exclusion of discontinuous spots.

Like the press tool of the invention, the method of the invention ensures a very tight connection between two elements to be connected without the formation of any press gaps.

Embodiments of the subject matter of the invention and of the method of the invention shall now be explained with reference to the drawings, in which.

Figure 1:
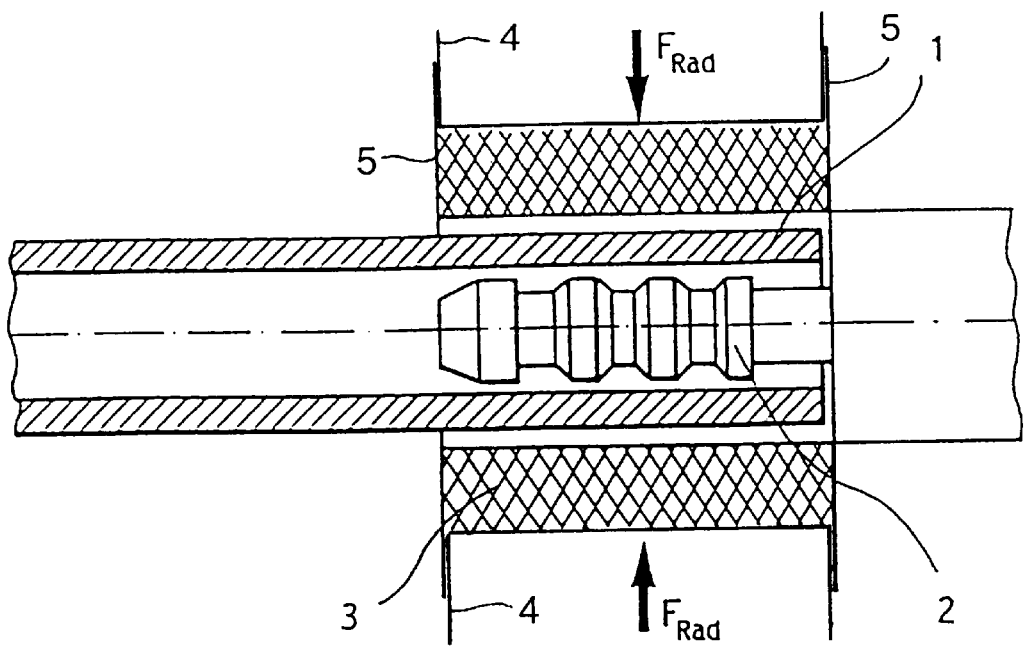
FIG. 1 shows a pipe to be connected to a connecting piece in its unpressed state.

In accordance with FIG. 1, a pipe 1 is to be connected to a connecting piece 2 which is internally inserted into the pipe body. To this end, the surface of the connecting piece is provided, over the portion inserted into the pipe body, with a plurality of annular grooves arranged in parallel with one another. Pipe 1 consists of a nonferrous metal, such as aluminum, and connecting piece 2 is made of steel. Whenever parts made of such materials are to be interconnected, problems arise due to the different material characteristics, so that welding or soldering is only possible to a limited degree or not at all.

Furthermore, the connection of these two elements is troublesome in conventional methods because of the complicated shape of the connecting piece, as this requires pressing tools adapted to the shapes of the connecting pieces, the production of which is expensive.

When using components with overdimensions and fixed process parameters, it may easily happen that the critical value for flattening the connecting piece (cylinder under external pressure) is exceeded. This results in failure of the connection.

In accordance with the invention, a pressure distributing element 3 is slid externally around pipe 1 in the area of the inserted connecting piece 2, and pressure is subsequently exerted via one or a plurality of press jaws 4 on the pressure distributing element, which exhibits the characteristics of an incompressible liquid, and on the connecting portion via the pressure distributing element.

Figure 2:
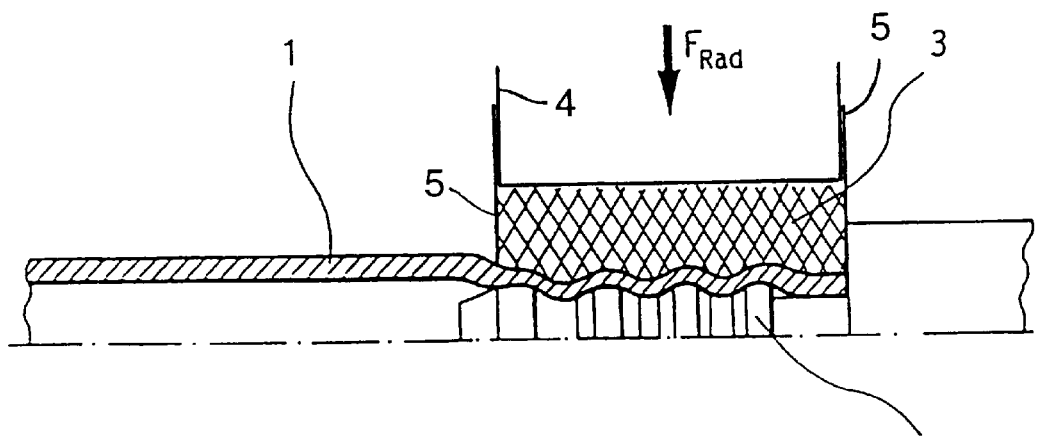
FIG. 2 shows the pipe illustrated in FIG. 1 during the deformation process.

As becomes apparent from FIG. 2, the surface of the pressure distributing element which is in contact with the connecting portion exactly adapts to the shape of the developing connection while pressure is being exerted on said element, i.e., it is possible owing to the pressure distributing element to achieve a tight connection both in the groove portions and in the other portions of the connecting piece without the use of a press tool having a complicated shape, since a pressure is exerted on the portions of pipe 1, which portions are be connected to the groove portions of connecting piece 2, that is stronger than the pressure exerted on the other portions.

The pressure distributing element preferably consists of rubber, since this material is capable of adapting to the special conditions of the connecting locations, especially to the shape.

To prevent the pressure distributing element of rubber from bulging laterally, rigid abutments may be used that are arranged as lateral borders at the right and left sides next to the intermediate element and represented in FIGS. 1 and 2 by lines 5. It can thereby be ensured that pressure is exerted on the pipe evenly and that it is only the pipe that deforms. If pressure is only exerted via a single press jaw 4, the use of additional boundary elements has proved to be successful in preventing radial bulging of the pressure element.

Figure 3:
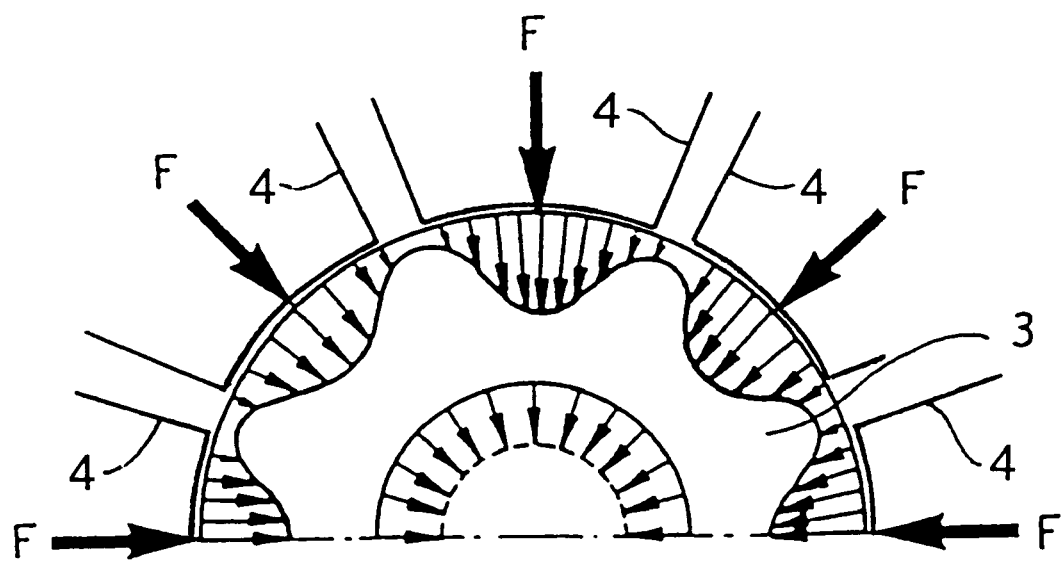
FIG. 3 shows the force distribution within the pressure distributing element.

FIG. 3 shows the force distribution of the pressure distributing element 3 which exhibits the characteristics of an incompressible liquid. Whenever pressure is exerted on the external surface by means of press jaws 4, i.e., on the surface of the pressure distributing element opposite to the connecting location, the external surface of the pressure distributing element will be deformed in accordance with the introduced force. The introduced force takes a constant radial course within the pressure distributing element, so that a uniform force can be exerted on the connection over the whole inner surface of the pressure distributing element, i.e. the surface of the pressure distributing element which communicates with the intermediate portion. It is thereby possible to obtain the required shape of the connection without the pipe surface being damaged or without the pipe being adversely affected by press gaps or shear effects.

For instance, in hydraulic systems, especially in power steering systems, the lines must acoustically be adapted to the whole system. This is normally accomplished by providing throttles in the flexible hose lines. So far it has not been possible to pull in the conduit because of the small admissible tolerances of the throttling port and the resultant high dimensional accuracy during manufacture.

It is possible by using the press tool of the invention and the method of the invention to exclude the formation of press gaps and thus throttling of the pipe or tube over its free length.

Other possible applications of the inventive press tool and of the inventive method are, for instance, the construction of lines or conduits in automotive vehicles or in the building industry, for instance in the case of water pipes of copper, the construction of lines in floor ducts using multi-layered aluminum pipes, conduits for electrical purposes, the pressing of metal cases onto components, such as pressure controllers.

We claim:

1. A press tool for connecting a tubular element to an element arranged in the interior and substantially adapted to the inner diameter of the tubular element, comprising:

press jaws for generating radially directed pressure power; and an annular pressure distribution element arranged radially between the press jaws and the outer circumference of the tubular element, said pressure distribution element acting as an incompressible liquid and being arranged around a connecting portion of the elements to be connected, thereby distributing the pressure power generated by the press jaws substantially over the outer circumference of the tubular element.

2. The press tool according to claim 1, wherein said pressure distribution element is made of rubber.

3. The press tool according to claim 1, wherein said pressure distribution element comprises a ring filled with liquid.

4. The press tool according to any one of claims 1 to 3, wherein said pressure distribution element has a surface profile in contact with the connecting portion of the elements to be connected.

5. The press tool according to claim 1, wherein said press tool further comprises boundary elements arranged laterally next to said pressure distribution element.

6. The press tool according to claim 1, wherein said press tool comprises eight press jaws arranged circumferentially around said pressure distribution element.

7. The press tool according to claim 4, wherein said radially arranged pressure distribution element includes individual segments assigned respectively to individual press jaws.

8. A method for connecting a tubular element to an interior element substantially adapted to the inner diameter of the tubular element, by using the press tool of claim 1 to evenly distribute a pressure over the circumference of the tubular element, and to exert the pressure without creating areas of discontinuous pressure.

* * * * *